Nov. 29, 1949  F. S. HEILBRONNER  2,489,490
PACKAGE FOR SHIRRED PLIABLE MATERIAL
Filed Dec. 6, 1946  2 Sheets-Sheet 1
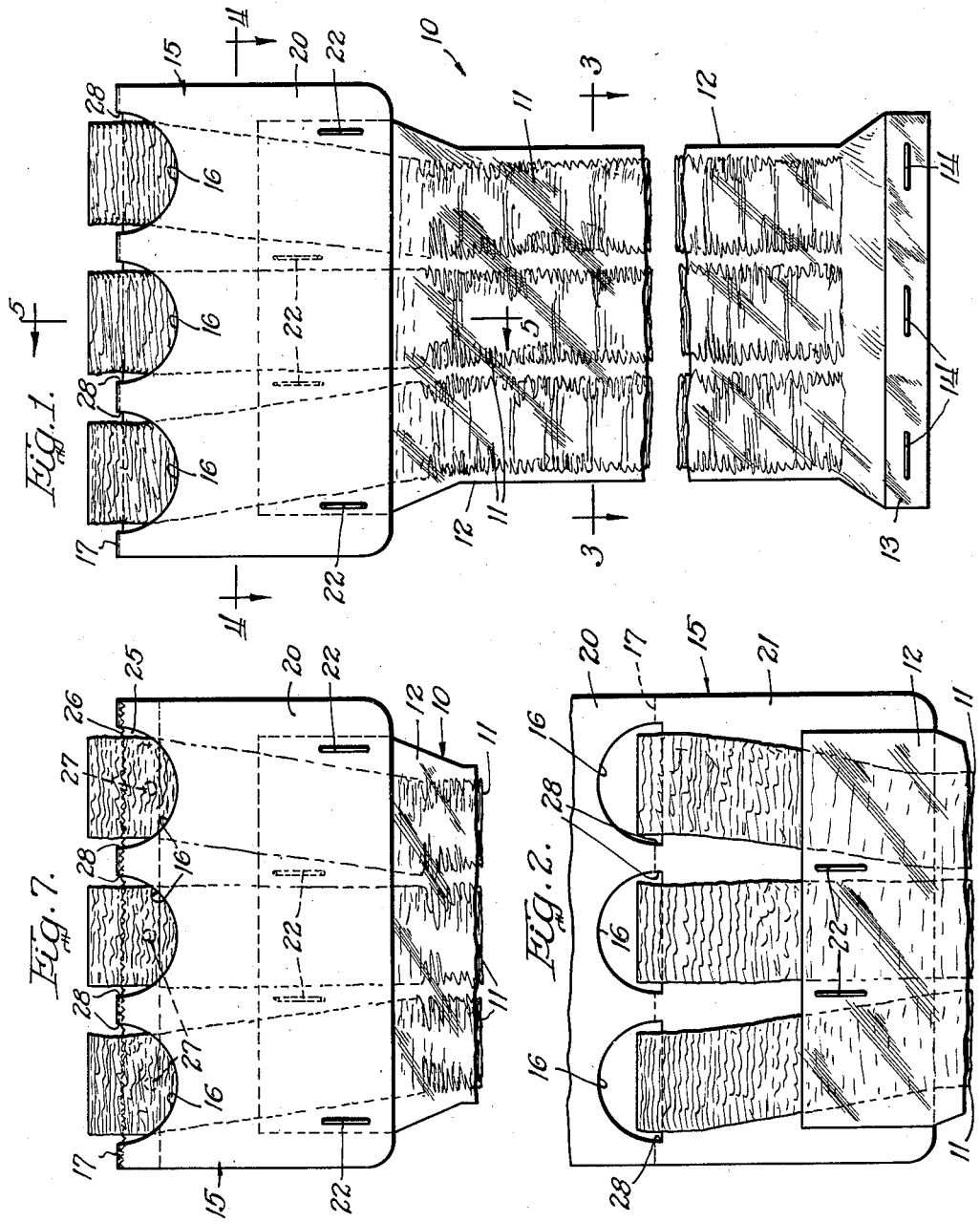
Inventor:
Frank S. Heilbronner
By Brown, Jackson, Boettcher & Dienner
Attys.

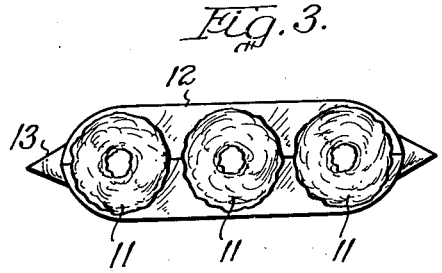
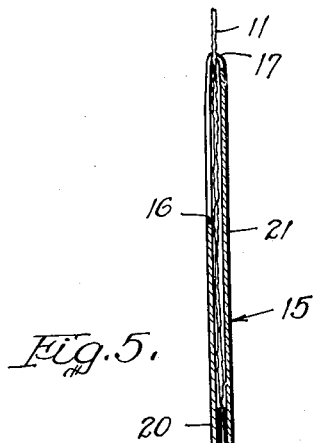
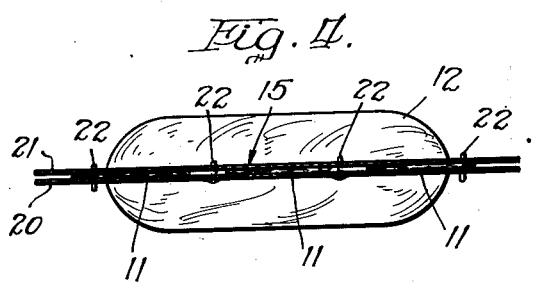
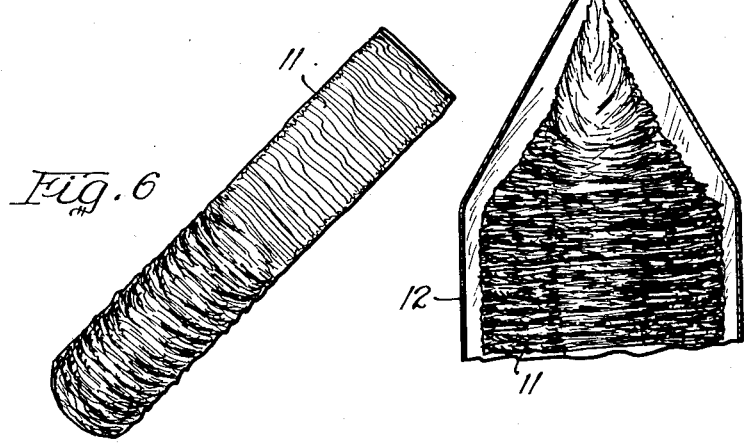

Patented Nov. 29, 1949

2,489,490

UNITED STATES PATENT OFFICE 2,489,490

PACKAGE FOR SHIRRED PLIABLE MATERIAL

Frank S. Heilbronner, Chicago, Ill., assignor to Transparent Package Company, Chicago, Ill., a corporation of Illinois Application December 6, 1946, Serial No. 714,575

10 Claims. (Cl. 206—56)

The present invention relates to packages for decorative material in the form of shirred tubes of pliable material (e. g. cellophane), which packages have an outlet end provided with a closure which serves to flatten out the shirred tubes in extended ribbon-like condition as they are withdrawn from the package.

Artificial sausage casings for frankfurters and the like have been made on a substantial scale for several years. Such casings are formed by extruding viscose solutions in continuous tubular form through suitable dies into a regenerating bath. The process corresponds quite closely to the manufacture of rayon. In order to package such artificial casing material in a form in which it may be conveniently stuffed with sausage emulsion, it is usual to shirr or accordion the tubular casing on a mandrel, so that many feet of extended casing may be compressed into a relatively short length. Several patents have been issued on various phases of manufacturing artificial sausage casings of this type, and some of these relate, particularly, to the formation of the shirred tubes. Patent 2,001,461, May 14, 1935, to A. G. Hewitt belongs in this latter group of patents.

The specifications which such artificial sausage casings must meet are relatively strict, particularly in respect to the minimum thickness and uniformity of the tubular walls. For this reason, it is necessary to reject a considerable portion of the output as being unsuitable for sausage casings.

It has been found that when such artificial sausage casing is dyed in different colors, it forms a very attractive decorative material, particularly, when extended and flattened to a crinkled ribbon-like condition. For this purpose, the rejected material serves just as well as that material which passes the specifications for sausage casings. The casing material may be easily dyed by passing it through a bath containing the desired dye for the different colors.

The primary object of the present invention is to provide a package for such shirred tubes with one end of the package provided with a closure which, besides closing the end of the package, also serves to extend and flatten the shirred tubes as they are withdrawn from the package, thus providing a ribbon of the material which may be used as a decorative material.

An important object of the invention is the provision of such a package which contains several shirred tubes of the casing material, preferably in different colors, so that different colored ribbons are made conveniently available in one unit.

Another important object of the invention is the provision of such a package wherein the flattening closure at the outlet end is provided with a saw-tooth edge allowing withdrawn lengths of the shirred tube to be conveniently severed.

Other objects of the invention will, in part, be obvious and will, in part, appear hereinafter.

For a more complete understanding of the nature and scope of the invention, reference may now be had to the following detailed description thereof, taken in connection with the accompanying drawings, wherein:

Figure 1 is a plan view of a package which forms a preferred embodiment of the invention;

Figure 2 is a fragmentary plan view of the closure end of the package shown in Figure 1, showing one side of the closure lifted before being secured in place;

Figures 3, 4, and 5 are sectional views taken on lines 3—3, 4—4 and 5—5, respectively, of Figure 1;

Figure 6 is a perspective view of one of the shirred tubes of plastic material contained in the package shown in Figure 1; and Figure 7 is a fragmentary plan view of the closure end of a package, as shown in Figure 1, modified by the provision of a saw-tooth edge at the outlet openings.

A package of decorative material is indicated generally at 10 in Figure 1 which contains three shirred tubes of pliable plastic material 11. One of these tubes 11 may be red, another may be colorless, while the third may be green. Of course, the selection of colors is optional. Likewise, the package 10 could be formed so as to contain only one tube 11, or any desired number of tubes.

As indicated above, the preferred source of the shirred tubes 11 is the output of small diameter artificial sausage casing material, which has been rejected for one reason or another. It will, of course, be understood that there are other sources of the shirred tubes 11 and, if desired, such shirred tubes may be manufactured particularly for this purpose alone.

The tubes 11 are contained in a tubular casing 12, which is preferably formed of a transparent sheet material, such as cellophane. A very convenient source of material for the tubular casings 12 is the artificial sausage casing which is produced for larger-size sausages, such as Bologna. A suitable length of such large diameter sausage casing may be folded over and closed at one end 13 by staples 14, as shown in Figure 1.

After being closed in this fashion, the casing 12 may be filled with the shirred tubes 11 so that they extend side by side therein, as shown. After the shirred tubes 11 have been inserted in the casing 12, a short length of each is extended at the end thereof so as to project beyond the open end of the casing 12. The package 10 can then be finished by attaching a closure 15 to the open end thereof.

The closure 15 is preferably in the form of a piece of cardboard having three semicircular openings 16 cut therein, as shown in Figure 2. The piece of cardboard is creased at 17 and folded over on itself so as to provide two sides 20 and 21, as shown in Figure 5. The closure 15 is then attached to the open end of the casing 12, preferably by the use of staples 22. In this manner, the closure 15 is attached to the flattened end of the casing 12 and sides 21 and 22 are also secured together in a flatwise relationship. The particular arrangement by which the staples 22 are applied is not important, except that care should be taken to leave clearances therebetween, so as to permit withdrawal of each of the shirred tubes 11.

As each of the tubes 11 is withdrawn through its respective outlet opening 16 in the closure 15, as illustrated in Figure 1, it will be extended and flattened as it passes between the sides 20 and 21, which are sufficiently stiff for this purpose. The transformation from tubular to flattened, ribbon-like form is shown in Figure 5. When a desired length of a shirred tube 11 has been withdrawn, it may be cut off, or otherwise severed at the opening 16 therefor in the closure 15.

A convenient arrangement for severing withdrawn lengths of the shirred tubes 11 is shown in Figure 7. A strip of metal 25, having a saw-tooth edge 26 is secured to one of the sides 20 or 21 along the crease or fold 17 by means of grommets 27. As shown in Figure 2 of the drawings, in forming the openings 16, part of the cardboard material forming the bottom side 21 is cut away at the crease 17, as indicated at 28. The strip 25 is so secured to side 21 that the saw-tooth edge 26 projects beyond this cut away portion 28, thereby allowing each of the extended ends of the shirred tubes 11 to be severed thereon.

Having fully set forth the nature and scope of the invention, and having described in detail a preferred embodiment and one modification thereof, what is claimed as new is:

1. A package holding a shirred tube of pliable material including closure means permitting withdrawal of said shirred tube in a flattened and extended condition, which comprises in combination, a tubular package casing which is open and flattened at one end, a shirred tube of pliable material disposed in said tubular package casing and extending out of said flattened end thereof, and closure means in the form of a relatively stiff piece of sheet material secured to said flattened end on at least one side thereof, said relatively stiff piece having sufficient stiffness to cause said shirred tube to be extended and flattened into a ribbon as it is withdrawn thereover.

2. A package holding a shirred tube of pliable material including closure means permitting withdrawal of said shirred tube in a flattened and extended condition, which comprises in combination, a tubular package casing of sheet material said casing being open and flattened at one end, a shirred tube of pliable material disposed in said tubular package casing and extending out of said flattened end thereof, and relatively stiff pieces of sheet material secured together on opposite sides of said flattened end, said relatively stiff sheet material having sufficient stiffness to cause said shirred tube to be extended and flattened into a ribbon as it is withdrawn therebetween.

3. A package holding a shirred tube of pliable plastic material including closure means permitting withdrawal of said shirred tube in a flattened extended condition, which comprises in combination, a tubular package casing of pliable sheet material, said tubular package casing being open and flattened at one end, a shirred tube of pliable plastic material disposed in said tubular casing and extending out of said flattened end, and closure means in the form of a piece of relatively stiff sheet material folded over on itself so as to form two sides which are secured flatwise together against opposite sides of said flattened end of said tubular casing, said stiff sheet material having an outlet opening therein adjacent the crease therein through which said shirred tube of plastic material may be withdrawn from said tubular casing in extended and flattened form, the extension and flattening of said shirred tube of plastic material being effected as it is withdrawn in between said sides of said piece of relatively stiff sheet material.

4. The combination called for in claim 3 wherein said outlet opening in said folded relatively stiff sheet material is formed by cutting away a portion of one of said two sides thereof adjacent said crease therein.

5. The combination called for in claim 3 wherein said tubular package casing is formed from transparent plastic material, and said relatively stiff sheet material is formed of cardboard.

6. The combination called for in claim 3 wherein said outlet opening in said relatively stiff sheet material is formed by cutting away a portion of both of said sides adjacent said crease therein, and a saw-tooth edge is provided on one of said folded sides of said piece of relatively stiff sheet material so as to project into said outlet opening whereby said extended and flattened plastic tubular material may be cut off thereon.

7. A package holding a plurality of shirred tubes of pliable plastic material including closure means permitting withdrawal of said shirred tubes in a flattened and extended ribbon-like condition, comprising in combination, a tubular package casing of pliable sheet material, said tubular package casing being open and flattened at one end, a plurality of shirred tubes of pliable plastic material disposed side by side in said tubular casing with an end of each shirred tube extending out of said open and flattened end, and closure means in the form of a piece of relatively stiff sheet material folded over on itself so as to form two sides which are secured flatwise together and against opposite sides of said flattened and open end of said tubular package casing, said stiff sheet material having a plurality of separate outlet openings therein equal in number to said plurality of shirred tubes and in alignment therewith, said outlet openings being located adjacent the crease in said folded sheet material, each of said shirred tubes on being withdrawn between said sides of folded sheet material and out through one of said outlet openings, being extended and flattened into a ribbon-like condition.

8. The combination called for in claim 7 wherein each of said outlet openings in said folded relatively stiff sheet of material is formed by cutting away a portion of one of said two sides thereof adjacent said crease therein.

9. The combination called for in claim 7 wherein said tubular casing is formed from transparent plastic material and said plurality of shirred tubes of plastic material therein are of different colors.

10. The combination called for in claim 7 wherein said outlet openings in said relatively stiff sheet material are formed by cutting away portion of both of said sides adjacent said crease therein, and a saw-tooth edge is provided on one of said folded sides of said piece of relatively stiff sheet material so as to project into said outlet openings whereby said extended and flattened ends of said shirred tubes may be cut thereon.

FRANK S. HEILBRONNER.

REFERENCES CITED

The following references are of record in the file of this patent:

UNITED STATES PATENTS

| Number | Name | Date |
|---|---|---|
| 1,162,750 | Canfield | Dec. 7, 1915 |

FOREIGN PATENTS

| Number | Country | Date |
|---|---|---|
| 605,544 | Germany | Nov. 13, 1934 |